Patented Apr. 15, 1941

2,238,471

UNITED STATES PATENT OFFICE 2,238,471

PRODUCTION OF DIHYDRIC ALCOHOLS OF THE ACETYLENE SERIES

Ernst Keyssner and Edwin Eichler, Ludwigshafen-on-the-Rhine, Germany, assignors, by mesne assignments, to General Aniline & Film Corporation, New York, N. Y., a corporation of Delaware No Drawing. Application October 4, 1939, Serial No. 297,820. In Germany October 28, 1938

6 Claims. (Cl. 260—635)

The present invention relates to the production of dihydric alcohols of the acetylene series.

We have found that dihydric alcohols of the acetylene series are obtained by reacting aldehydes or ketones in the presence of heavy metals of the first or second group of the periodic system and their compounds and if desired in the presence of substances having the effect of binding acids with alcohols of the acetylene series which contain a hydrogen atom attached to an acetylene carbon atom. Such alcohols of the acetylene series are for example propargyl alcohol and its homologues, such as butine-1-ol-3, 2-methylbutine-3-ol-2 and other alkyl-propargyl alcohols, and also derivatives of propargyl alcohol containing aromatic radicles, such as phenyl propargyl alcohol. Sometimes, by the reaction of homologues of propargyl alcohol with formaldehyde, the expected homologues of butine-2-diol-1.4 are surprisingly not formed, but the said compound itself. The direction taken by the reaction depends on the nature of the catalyst used.

It is also possible to work in the presence of solvents or suspension agents, as for example water, alcohols, ethers, mixtures of the same and hydrocarbons. In many cases, especially when using aldehydes or ketones which are liquid under the reaction conditions, the solvent may be dispensed with.

The reaction is mostly carried out in weakly acid or neutral reaction, when starting from aldehydes. When starting from keytones the reaction liquid may as well be alkaline. If the reaction liquid be too strongly alkaline, the dihydric alcohols formed may be split off to form acetylene and carbonyl compounds. The hydrogen ion concentration, therefore, is advantageously kept between about pH=2.5 and pH=12. If the reaction liquid be too acid, the catalysts are more or less rapidly split off under formation of acetylene so that the yields are rather poor.

As catalysts there are suitable in particular the acetylene compounds of copper, silver, gold or mercury or mixtures thereof, in particular the copper acetylide. In order to render innocuous the amount of acid often present in the aldehydes, substances may be added to the reaction mixture which are capable of binding acid, as for example salts of the alkali and alkaline earth metals and of magnesium with weak acids, as for example the formates, acetates, carbonates and bicarbonates. Alkaline earth hydroxides, as for example calcium or barium hydroxide, and other weakly basic substances are also suitable, as for example zinc oxide, zinc carbonate and alkali phosphates and silicates.

Acetylene compounds of heavy metals of the first and second group of the periodic system of elements may be prepared in known manner, for example by leading acetylene into solutions or suspensions of salts, oxides or hydroxides of the said heavy metals, for example of copper oxide or hydroxide, copper phosphate or acetate, cuprous chloride, cupric chloride, ammoniacal copper sulphate, silver nitrate or mercury chloride or mixtures of these salts, if necessary in the presence of one of the said acid-binding agents. The resulting heavy metal compounds are filtered off by suction, freed from residues of adherent solvent by washing with water or organic solvents and further used in moist form. The catalysts may also be applied to bodies having a large surface, as for example kieselguhr, silica gel or active carbon.

It is also possible to allow these acetylene compounds to be formed in the course of the reaction itself by the action of acetylene set free by the decomposition of part of the starting material. In this case to the starting mixture there is added a heavy metal oxide or hydroxide or a heavy metal salt of the kind defined above, for example copper hydroxide or cuprous or cupric chloride and a compound which is capable of binding the acid which is set free in the formation of the acetylene compound from the metal salt. Substances capable of binding acids are already mentioned above.

The reaction proceeds especially readily at moderately elevated temperatures as for example from 40 to 150° C. It may, if desired, continuously be carried out at ordinary, reduced or increased pressure. When working at superatmospheric pressure, for example at pressures between 2 and 30 atmospheres, it is suitable to apply inert gases, for example nitrogen or carbon dioxide.

The reaction may be carried out with aliphatic aldehydes of saturated or unsaturated nature, e. g. formaldehyde, acetaldehyde, oenanthaldehyde or crotonaldehyde, and also with cyclic aldehydes as for example benzaldehyde. Suitable ketones are for example acetone and methyl ethyl ketone.

The following examples will further illustrate how this invention may be carried out in practice but the invention is not restricted to these examples. The parts are by weight.

*Example 1*

210 parts of 30 per cent formaldehyde solution are mixed in a pressure-tight vessel with 10 parts of a moist catalyst containing in addition to water 42 parts of copper acetylide on 100 parts of fuller's earth (prepared by leading acetylene into an ammoniacal cuprous chloride solution in the presence of fuller's earth) and with 5 parts of calcium carbonate and 10 parts of propargyl alcohol. Nitrogen is then pressed in under a pressure of 20 atmospheres and the whole is heated for an hour at 100° C. After cooling the catalyst is separated off, the water is distilled off from the filtrate under reduced pressure and butine-2-diol-1.4 is then obtained in a good yield from the residue by distillation. Its boiling point is 145° C. at a pressure of 20 millimeters (mercury gauge).

*Example 2*

200 parts of 30 per cent formaldehyde solution, 8 parts of the copper acetylide catalyst described in Example 1, 2 parts of calcium carbonate and 112 parts of propargyl alcohol are heated for 20 hours at 95° C. in an open vessel provided with a reflux condenser while a current of nitrogen is continuously led through the mixture. After cooling, the catalyst is removed, the water is evaporated and the residue distilled under reduced pressure. Butine-2-diol-1.4 is thus obtained in a good yield.

*Example 3*

150 parts of 30 per cent formaldehyde solution, 6 parts of the copper acetylide catalyst described in Example 1, 3 parts of calcium carbonate and 126 parts of 2-methyl-butine-3-ol-2 (boiling point from 102° to 103° C. under a pressure of 760 millimeters (mercury gauge)) are heated for some hours at 100° C. in the manner described in Example 1 in a pressure vessel. After cooling, the catalyst is removed, the water expelled and the residue distilled in vacuo. Butine-2-diol-1.4 is obtained in a good yield.

*Example 4*

A mixture of 280 parts of butine-3-ol-2, 400 parts of 30 per cent aqueous formaldehyde solution, 1.6 parts of calcium carbonate and cuprous hydroxide (such as is obtained by precipitating a solution of 20 parts of cuprous chloride in 300 parts of 12 per cent hydrochloric acid with 300 parts of 40 per cent caustic potash in the cold and washing out) is heated under reflux for 2½ days. The acetaldehyde (in all about 8 parts) thus formed in addition to acetylene as a by-product by the splitting of butine-3-ol-2 is collected in a receiver behind the reflux condenser kept at 22° to 25° C. When the reaction is completed, the cuprous acetylide precipitate is removed by filtration by suction and washed with a little water. It may be used again as catalyst.

By fractional distillation of the filtrate there is obtained first a mixture of butine-3-ol-2 and water from which by salting out with potassium carbonate 36 parts of butine-3-ol-2 may be recovered. There are also obtained 4.5 parts of butine-2-diol-1.4 and finally, under a pressure of from 1 to 2 millimeters (mercury gauge), 247 parts of pentine-3-diol-2.5

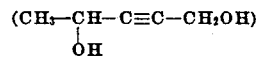

which boils at from 110° to 112° C.

14 parts of unchanged formaldehyde separate in the reflux condenser as polymeric formaldehyde.

*Example 5*

A mixture of 420 parts of 2-methylbutine-3-ol-2, 500 parts of 30 per cent formaldehyde and 2 parts of calcium carbonate with the cuprous hydroxide prepared as described in Example 4 is heated for one day under reflux while stirring. By working up in the manner described in Example 4 there are obtained 190 parts of unchanged initial material, 4 parts of acetone, a small amount of butine-2-diol-1.4 and 250 parts of methyl-2-pentine-3-diol-2.5 having a boiling point of from 102° to 104° C. under a pressure of 2 millimeters (mercury gauge).

What we claim is:

1. A process for the production of dihydric alcohols of the acetylene series which consists in causing a carbonyl compound selected from the class of aldehydes and ketones to react in the liquid phase with a monohydric alcohol of the acetylene series which contain a hydrogen atom attached to an acetylene carbon atom in the presence of an acetylide of a metal selected from the class consisting of copper, silver, gold and mercury.

2. A process for the production of dihydric alcohols of the acetylene series which consists in causing a carbonyl compound selected from the class of aldehydes and ketones to react in the liquid phase with a monohydric alcohol of the acetylene series which contain a hydrogen atom attached to an acetylene carbon atom in the presence of an acetylide of a metal selected from the class consisting of copper, silver, gold and mercury which acetylide is formed within the reaction mixture from a compound of said metals.

3. A process for the production of dihydric alcohols of the acetylene series which consists in causing a carbonyl compound selected from the class of aldehydes and ketones to react in the liquid phase with a monohydric alcohol of the acetylene series which contain a hydrogen atom attached to an acetylene carbon atom in the presence of copper acetylide.

4. A process for the production of dihydric alcohols of the acetylene series which consists in causing an aliphatic aldehyde to react in the liquid phase with a monohydric alcohol of the acetylene series which contain a hydrogen atom attached to an acetylene carbon atom in the presence of copper acetylide.

5. A process for the production of dihydric alcohols of the acetylene series which consists in causing formaldehyde to react in the liquid phase with a monohydric alcohol of the acetylene series which contain a hydrogen atom attached to an acetylene carbon atom in the presence of copper acetylide.

6. A process for the production of butine-2-diol-1.4 of the acetylene series which consists in treating an aqueous solution of formaldehyde with propargyl-alcohol in the presence of copper acetylide.

ERNST KEYSSNER.
EDWIN EICHLER.